M. F. WILLIAMS.
FEED MIXING MACHINE.
APPLICATION FILED JUNE 12, 1911.
1,035,288.
Patented Aug. 13, 1912.
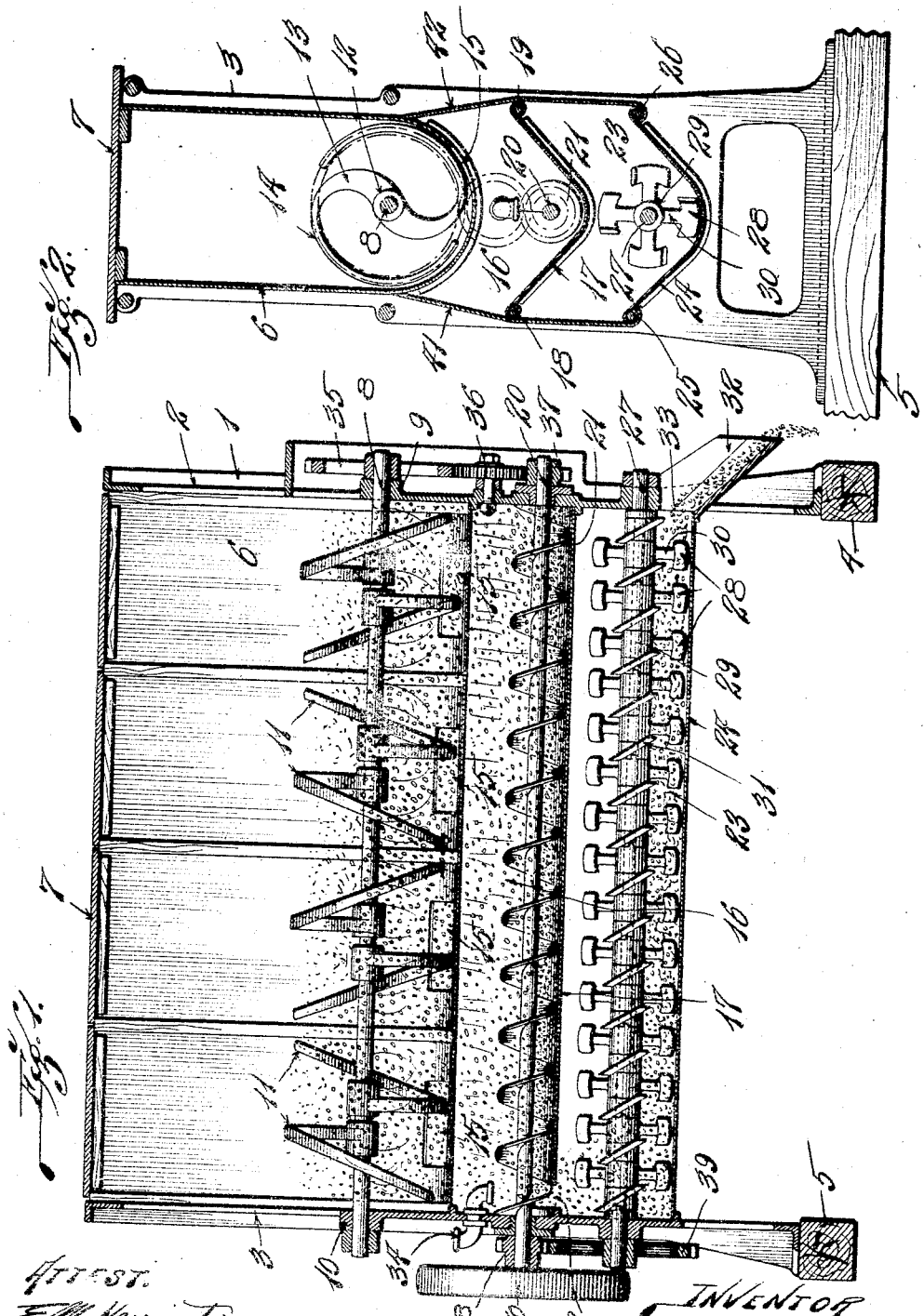

UNITED STATES PATENT OFFICE.

MILTON F. WILLIAMS, OF ST. LOUIS, MISSOURI, ASSIGNOR TO WILLIAMS PATENT CRUSHER & PULVERIZER COMPANY, A CORPORATION OF MISSOURI.

FEED-MIXING MACHINE.

1,035,288.    Specification of Letters Patent.    Patented Aug. 13, 1912.

Application filed June 12, 1911. Serial No. 632,816.

*To all whom it may concern:*

Be it known that I, MILTON F. WILLIAMS, a citizen of the United States, residing at St. Louis, Missouri, have invented a certain new and useful Improvement in Feed-Mixing Machines, of which the following is a full, clear, and exact description, such as will enable others skilled in the art to which it appertains to make and use the same, reference being had to the accompanying drawings, forming part of this specification, in which—

Figure 1 is a side elevational view in section of my improved machine. Fig. 2 is a section taken transversely of the machine.

My invention relates to an improvement in mixing machines and especially to that class of machines intended to thoroughly mix such materials as are commonly used to feed animals such as chickens, etc.

The object of my improvement is to provide a mixing machine in which the ingredients of the feeding material such as corn, wheat, bran, etc., may be inserted and thrown together to be mixed and afterward passed through a series of conveyers to thoroughly complete the mixing operation.

Referring to the drawings: 1 indicates the frame of the mixing device which is comprised of two end members 2 and 3 suitably attached and supported on cross beams 4 and 5 or other suitable supporting means. The ends 2 and 3 are connected at the top by a U-shaped sheet iron structure 6 forming the feed receptacle. This receptacle is suitably braced along its length and is provided with removable covers 7 at the top. In the lower portion of the receptacle is positioned a shaft 8 journaled at 9 and 10 within the end frames 2 and 3. On this shaft are fixed a series of arms 11 which are of the same general shape but differently arranged upon the shaft. Each arm is provided with a hub portion 12 and a curved radial arm portion 13 with an extension 14 arranged substantially concentric to the shaft 8, said extension being bent to one side of the radial arm 13. These arms 11 are arranged as shown in Fig. 1 with the radial portions 13 positioned on opposite sides diametrically of the shaft 8 so that the curved extensions 14, when two of these arms are positioned as stated, cover substantially the entire periphery of a circle having shaft 8 as the center thereof. These arms 13 are arranged in sets of two along the length of the shaft and preferably the bent end 14 in one pair are inclined oppositely to those in the next adjacent pair. A series of openings 15 are cut within the bottom of the receptacle 6 for the passage of the material when thoroughly mixed within the receptacle.

Below the receptacle 6 is positioned a conveyer compartment 16 formed of a piece of sheet metal 17 bent to engage at each end in cross rods 18 and 19 extending between the end frames 2 and 3. A shaft 20 is journaled within removable bearings in the end frames 2 and 3 and has a continuous spiral conveyer 21 positioned thereon extending entirely through the conveyer compartment 16 from end to end, said compartment being cut away at the lower side at 22 for the passage of the mixture. Below the conveyer compartment 16 is a second conveyer compartment 23 formed of sheet metal 24 bent at either end and around cross bars 25 and 26 extending between the end frames 2 and 3. A shaft 27 is journaled within the end frames and within the compartment 23 and upon this shaft is fixed a series of arms or blades forming a conveyer and mixer, each arm 28 comprising a hub 29 having oppositely arranged radial arms 30 with flights or wings 31 positioned diagonally at the extremities thereof, these flights or wings 31 being beveled at the end to form sharp edges. A delivery chute 32 is fastened to the lower side of one end of the compartment 23 which has an opening 33 communicating therewith. I have also shown a pipe 34 positioned within the end wall 3 communicating with the compartment 16 as well as with the outside of the wall for the injection of water.

A gear 35 is arranged on the outer end of shaft 8 intermeshing with pinion 36 journaled within the end wall 2 which pinion in turn engages the under pinion 37 on the outer end of the shaft 20. At the opposite end of the shaft 20 is arranged a pinion 38 engaging with the gear 39 on shaft 27. A drive wheel 40 is suitably fixed on the shaft 20. Suitable side pieces 41 and 42 of sheet metal are attached to the sides of the receptacle 6 and extend downwardly to embrace the cross bars 25 and 26 forming side inclosures for the compartments 16 and 23.

The various materials to form the mixture are placed within the receptacle 6 and the arms 14 which are rotated very rapidly throw the particles of the various materials together and gradually move the mixture over one of the openings 15 from whence it drops into the compartment 16 to be fed toward the left in Fig. 1 by the conveyer 21 whence it is delivered through the opening 22 into the compartment 23 to be acted upon by the conveyer arms 28 which not only serve to thoroughly mix the materials but feed it toward the discharge spout 32.

I am aware that minor changes can be made in the arrangement, construction and combination of the various elements in my device without departing from the spirit of my invention, the scope of which is indicated in the accompanying claims.

What I claim is:

1. In a mixing machine, a mixing receptacle provided with a series of openings, a series of flights operating over said openings, a mixing compartment provided with a feed opening at one end and a discharge opening at the other, a conveyer compartment extending below the openings in the mixing receptacle, a conveyer in said conveyer compartment adapted to feed material to the feed opening of the mixing compartment, and combined feeding and mixing mechanism in said mixing compartment adapted to feed material from the feed opening to the discharge opening.

2. In a mixing machine, a mixing receptacle, a shaft in said mixing receptacle and mixing flights on said shaft, said flights having a radial arm attached to said shaft and having a free arm curved spirally relative to said shaft.

3. A feed mixer comprising a casing divided into three superimposed compartments, the uppermost of said compartments being provided with an opening communicating with the intermediate compartment, the intermediate compartment being provided with an opening communicating with the lowermost compartment, mixing flights in the uppermost compartment, a conveyer in the intermediate compartment, and combined mixing and conveying mechanism in the lowermost compartment, one of said compartments being provided with an opening for the injection of liquid.

4. A mixing machine comprising a pair of end frames, a feed receptacle mounted between said end frames, a conveyer compartment mounted between said end frames below said feed receptacle, a mixing compartment mounted between said end frames below said conveyer compartment, shafts journaled in said end frames and extending through said respective compartments, and mixing and conveying members mounted on said shafts.

In testimony whereof I hereunto affix my signature in the presence of two witnesses, this 9th day of June, 1911.

MILTON F. WILLIAMS.

Witnesses:
M. P. SMITH,
E. M. HARRINGTON.